(12) United States Patent
Bohon et al.

(10) Patent No.: US 6,273,144 B1
(45) Date of Patent: Aug. 14, 2001

(54) METHOD FOR INHIBITING EXTERNAL CORROSION ON AN INSULATED PIPELINE

(75) Inventors: William M. Bohon, McKinney, TX (US); Gregory R. Ruschau, Delaware, OH (US)

(73) Assignee: Atlantic Richfield Company, Los Angeles, CA (US)

( * ) Notice: Subject to any disclaimer, the term of this patent is extended or adjusted under 35 U.S.C. 154(b) by 0 days.

(21) Appl. No.: 09/544,194

(22) Filed: Apr. 6, 2000

(51) Int. Cl.$^7$ ....................................... F16L 9/14
(52) U.S. Cl. .............................. 138/149; 138/146
(58) Field of Search ........................ 138/145, 146, 138/149; 106/83

(56) References Cited

U.S. PATENT DOCUMENTS

| | | | |
|---|---|---|---|
| 3,665,968 | * 5/1972 | De Putter | 138/149 |
| 4,011,195 | * 3/1977 | Self | 106/83 |
| 4,159,361 | * 6/1979 | Schupack | 106/99 |
| 4,162,093 | * 7/1979 | Sigmund | 138/114 |
| 4,225,678 | * 9/1980 | Roy | 106/122 |
| 4,255,527 | * 3/1981 | Roy | 521/117 |
| 4,590,971 | * 5/1986 | Webster et al. | 138/172 |
| 4,759,917 | * 7/1988 | Coleman et al. | 423/87 |
| 5,641,584 | * 6/1997 | Andersen et al. | 428/703 |
| 5,834,075 | * 11/1998 | Miller | 138/146 |

OTHER PUBLICATIONS

"McGraw–Hill Encyclopedia Of Science & Technology, 6th Edition," McGraw–Hill Book Company 1987.

* cited by examiner

Primary Examiner—James Hook
(74) Attorney, Agent, or Firm—F. Lindsey Scott

(57) ABSTRACT

A method for inhibiting external corrosion on an insulated pipeline including a pipe and a coating material around the pipe by positioning an alkaline material in the coating material.

20 Claims, 1 Drawing Sheet

METHOD FOR INHIBITING EXTERNAL CORROSION ON AN INSULATED PIPELINE

FIELD OF THE INVENTION

This invention relates to a method for inhibiting external corrosion on an insulated pipeline by admixing an alkaline material with a coating material applied to the pipeline. A corrosion resistant coated pipeline is also disclosed.

BACKGROUND OF THE INVENTION

In many industrial applications wherein fluids are transported from one location to another pipelines are used. A continuing problem with such pipelines is that corrosion can occur in many forms and can weaken the pipeline to a point of failure. One of the most common types of corrosion is corrosion from the inside of the pipe as a result of corrosive materials which are transported in the pipe either as the primary material transported or as a contaminant material. This corrosion in many instances tends to form pits in the pipe and eventually may result in pinhole leaks or larger failures if the corrosion is particularly severe before discovery. Such failures typically result primarily in the loss of transported material with the resulting contamination of the environment and the like.

Frequently such pipelines are covered with coating materials, which may also function as an insulation material. Such coatings may be organic or inorganic fibrous materials, polymeric foams and the like. When such materials are used to cover the outside of the pipe, the potential exists for the accumulation of water in the coating material, particularly in pipelines which are insulated using insulating materials which are contained in an outer shell. Such materials are frequently used with an outer shell to protect the insulating material from the weather. When water collects in such insulating materials and comes in contact with the outer surface of the pipe, which is typically carbon steel, the water becomes corrosive to the pipe. Corrosion to the pipe in this fashion results in corrosion of the pipe from the outside over relatively large areas and may result in catastrophic pipe failures when periods of increased pressure occur and the like. Since many such insulating materials are closed cell or otherwise retain water, it is not feasible to remove this water by simply placing drains in the bottom of the outer shell. Further, the insulating material may be formed with an integral outer shell of sealing polymeric material or the like. Alternatively, the outer shell may be formed of a thin metallic material such as galvanized sheet steel. In any event, pipe failures for this reason are a significant problem in industry. Such pipes are frequently used in oil production operations, refinery operations, chemical operations, and a wide variety of other applications where it is desirable to transport fluids, especially if the fluids are at a temperature other than ambient.

As a result of the large number of pipe failures from external pipe corrosion as a result of water present in coating materials, methods have been sought to eliminate such failures.

SUMMARY OF THE INVENTION

According to the present invention, a method of inhibiting external corrosion on an insulated pipeline comprising a pipe and a coating material around the pipe is provided. The method consists essentially of mixing an alkaline material with the coating material around the pipe in an amount sufficient to provide a pH from about 8 to about 12 in water in the coating material.

The invention further comprises a corrosion inhibited pipeline comprising a pipe having an outside, a coating material containing an alkaline material in an amount sufficient to produce a pH from about 8 to about 12 in water in the coating materials and an outer shell having an inside, the coating material being positioned to substantially fill an annular space between the outside of the pipe and the inside of the outer shell.

DESCRIPTION OF PREFERRED EMBODIMENTS

Figure 1:
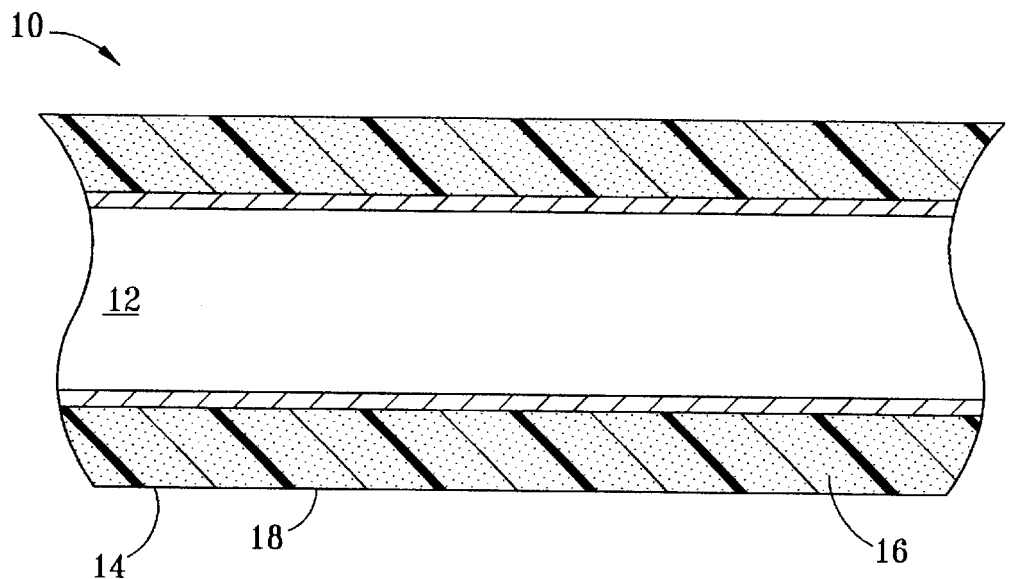
FIG. 1 is a schematic diagram of a pipeline having a lower section.

In many instances polymeric foam materials, inorganic fibrous materials, organic fibrous materials, and the like are used to coat the exterior of pipelines to insulate or protect the pipelines which are used for the transportation of fluids. Such materials may be formed with a substantially waterproof exterior as a part of the coating material or they may be encased in a shell to cover the coating material to retard the entry of water, damage to the coating material and the like. In all such instances, the potential exists for the accumulation of water in the coating material in areas where the water is in contact with the exterior of the pipe. The contact of the water with the pipe over prolonged periods results in corrosion of the exterior of the pipe to the point that failures can occur over wide areas of the pipe. Since the pipes are typically made of carbon steel they are vulnerable to corrosion by water contact, especially contact with water at pH values below about 8.0.

According to the present invention, an alkaline material is admixed or formed as a part of or otherwise positioned in the coating material. The alkaline material is desirably present in a quantity sufficient to produce a pH from about 8.0 to about 12.0 in water in the coating material. Desirably the pH is about 9.5 when carbon steel is used as the pipe material.

Desirably the alkaline material is present in the coating material in an amount from about 0.001 molar to about 1.0 molar based upon the moles of the alkaline material in one liter of water-saturated coating material.

Any alkaline material which results in the desired pH in the water positioned in the coating material is suitable provided the alkaline material does not inhibit the application or formation of the coating material or result in degradation of the coating material or produce other undesirable effects in the coating material. Some suitable alkaline materials are sodium hydroxide, potassium hydroxide, sodium carbonate, ammonium hydroxide, lithium hydroxide, lithium hydroxide hydrates, sodium sulfide monohydrate, tribasic sodium orthophosphate, dibasic sodium phosphate, sodium meta-silicate, potassium orthophosphate, potassium sulfide mono-pentahydrate and mixtures thereof A preferred alkaline material is tribasic sodium orthophosphate.

The alkaline material can be incorporated into the coating material in a wide variety of ways. For instances, when polymeric foams are used the alkaline material may be mixed with one or all of the polymeric materials used to form the polymeric foam, the alkaline material may be formed in or otherwise associated with fibrous coating materials mixed with the coating prior to application to the pipe, and the like.

In one particularly preferred embodiment, the alkaline material is admixed with a polymeric foam used to coat pipelines.

A preferred polymeric foam is polyurethane foam. Polyurethane foams are well-known to the art as are a wide variety of other coating materials. Polyurethane foams are disclosed in *McGraw-Hill Encyclopedia of science and Technology*, 6th Ed., McGraw-Hill Book Co., 1987, pp. 168.

Figure 2:
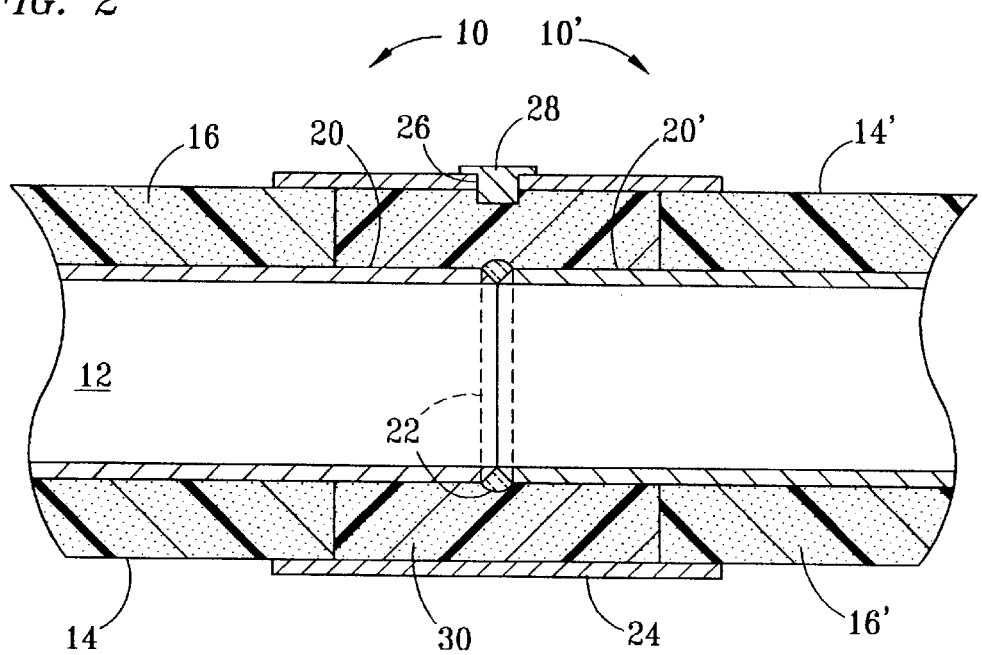
FIG. 2 is a schematic diagram of a connection point of pipe sections.

One illustration of a preferred embodiment of the present invention is shown in FIGS. 1 and 2. In FIG. 1, an insulated section of a pipeline 10 is shown. Pipeline 10 includes a pipe 12, a shell 14, insulation 16 positioned around pipe 12 with shell 14 being positioned to enclose insulation 16 with a low section 18 being shown in FIG. 1. In pipelines of the type shown in FIG. 1, it is desired that shell 14 be substantially waterproof. Accordingly, pipeline 10 may be formed as shown in FIG. 2, where a second section 10' is shown. Each section 10 and 10' has a pipe end portion 20 or 20', which extends beyond insulation 16 or 16' in the respective pipe sections. These end portions have been joined at a weld 22. A coupling 24 has then been placed to engage the outside of shell 14 and shell 14'. An insulating material, typically the same type material used to coat sections 10 and 10', is then injected through a port 26 to insulate the weld area and a plug 28 is installed to close port 26 after injection of the insulation.

In the system shown, which is particularly adapted to the use of polyurethane or other polymeric foams as an insulating material, the components necessary to form the polyurethane form are injected into the annular space between an outside of pipe 12 and an inside of shell 14 to form the insulating foam in place. The alkaline materials are desirably added to one or all of the components used to form the polyurethane foam. Similarly, the alkaline materials are used in the components to form the polyurethane foam formed around the weld area as described above.

While the invention has been described in this preferred embodiment with particular reference to polyurethane foams, it should be understood that a wide variety of foams and other coating materials could be used to coat pipe 12. These coatings can be used with or without shell 14. Desirably the alkaline material is included in such coatings in the quantities discussed above to provide the desired pH in water in the coating material. The pH of water in the coating material is suitably from about 8 to about 12 and is desirably about 9.5. It is desirable that the pH be no higher than 12 because of concerns about damage to the pipe by reason of stress corrosion cracking. As a result, it is desirable when using highly basic materials, as the alkaline material that buffering compounds as known to the art be used to control the pH within the desired limits.

The quantity of alkaline material used is from about 0.001 to about 1.0 molar based upon the moles of the alkaline material in one liter of water saturated coating material. When tribasic sodium orthophosphate is used as the alkaline material, it is desirable that tribasic sodium orthophosphate be present in an amount from about 0.005 to about 0.10 molar.

Many of the polymeric foams, which are suitable for use in the present invention, are closed cell foams, which are generally considered to provide little or no fluid communication between the individual cells and to be relatively impervious to water. Nevertheless, it has been found that over extended periods of time either by vapor diffusion or other methods not clearly understood, water frequently becomes contained in such closed cell foams. When such water is contained in such closed cell foams, it is capable of contacting the pipe and corroding the pipe. It is not feasible, however, to drain the water from such coatings since the water does not flow freely from the coating. Penetration of the shell or the coating will result in the removal of only minor amounts of water from the immediate vicinity of the penetration. As a result, it is necessary that the water be treated to reduce its corrosiveness.

It is has been found that alkaline material can be incorporated into insulating and coating materials, without detriment to such materials, in sufficient quantities to result in the desired pH range in water in the coating materials. This has been found to greatly extend the useful life of pipe in such applications. In many such applications, the life of the pipe is sufficient if it lasts during the life of the operation contemplated. In other words, if the pipe is used to produce oil from an oil well, if the life of the pipe can be extended to last until production has been completed from the well, then the pipe will most likely be removed in any event. Similar considerations apply in other applications. By the use of the present invention, it is contemplated that the life of pipe may be extended by up to ten times the normal life when conventional coating materials are used.

EXAMPLE 1

A number of foam samples containing the alkaline materials shown in Table 1 below were prepared. These samples were then sectioned and carbon steel coupons were placed on each section. The samples were left in place in water for three months at ambient temperature and the resulting corrosion was observed. The foam samples were placed in volumes of water sufficient to provide the molarities shown in Table 1.

TABLE 1

| LIQUID | ALKALINE MATERIAL | MOLARITY | pH | RESULT |
|---|---|---|---|---|
| Water | 0 | 0 | 7.46 | Severe rust |
| Water | $Na_3PO_4$ | 0.001 | 7.77 | Rust |
| Water | $Na_3PO_4$ | 0.005 | 8.32 | Darkening |
| Water | $Na_3PO_4$ | 0.01 | 8.71 | Slight darkening |
| Water | $Na_3PO_4$ | 0.05 | 9.24 | Less darkening |
| Water | $Na_3PO_4$ | 0.10 | 9.46 | Negligible darkening |
| Water | $Na_3PO_4$ | 0.50 | 10.94 | Neglible darkening |
| Water | NaOH | 0.01 | 8.96 | Rust |
| Water | 90% NaOH 10% $Na_3PO_4$ | 0.01 | 9.2 | Slight darkening |

The test with sodium hydroxide was observed to result in rust very early in the test before the sodium hydroxide had leached from the foam to a sufficient extent to provide the desired pH. It is believed that in this test, corrosion was inhibited after the initial rust formation at the initial low pH.

EXAMPLE 2

A quantity of polyurethane foam containing a quantity of alkaline material was prepared and subsequently finely divided. This material was placed in water and the pH observed. The pH quickly increased to an elevated level indicating that the alkaline material is efficiently removed from the polyurethane foam material when water is present.

It is believed clear in view of the foregoing examples and discussion that the inclusion of alkaline material in coating material for pipes, especially polymeric foams and inorganic and organic fibrous materials is effective to prevent external corrosion of the pipe by water accumulation or presence in the coating material.

Having thus described the present invention by reference to certain of its preferred embodiments, it is pointed out that many variations and modifications are possible within the scope of the present invention. Many such variations and modifications may be considered obvious and desirable by those skilled in the art based upon a review of the foregoing description of preferred embodiments.

Having thus described the invention, we claim:

1. A method for inhibiting external corrosion on a pipeline comprising a pipe and a polymeric foam coating material around the pipe, the method comprising admixing an alkaline material with the polymeric foam coating material around the pipe in an amount sufficient to produce a pH from about 8.0 to about 12.0 in water in the polymeric foam coating material.

2. The method of claim 1 wherein the pH is about 9.5.

3. The method of claim 1 wherein the alkaline material is present in an amount from about 0.001 molar to about 1.0 molar based upon the moles of the alkaline material in one liter of water-saturated polymeric foam coating material.

4. The method of claim 3 wherein the alkaline material is selected from the group consisting of sodium hydroxide, potassium hydroxide, sodium carbonate, ammonium hydroxide, lithium hydroxide, lithium hydroxide hydrates, sodium sulfide monohydrate, tribasic sodium orthophosphate, dibasic sodium phosphate, sodium metasilicate, potassium orthophosphate, potassium sulfide monopentahydrate and mixtures thereof.

5. The method of claim 4 wherein the alkaline material is tribasic sodium orthophosphate.

6. The method of claim 5 wherein the tribasic sodium orthophosphate is present in an amount from about 0.005 to about 0.10 molar.

7. The method of claim 4 wherein a buffer material is present to maintain the pH in the water in the coating material from about 8.0 to about 12.0.

8. The method of claim 7 wherein the pH is about 9.5.

9. The method of claim 1 wherein the polymeric foam coating material is a polymeric foam insulation.

10. The method of claim 1 wherein the polymeric foam coating material is a polyurethane foam.

11. The method of claim 1 wherein the polymeric foam coating material is a polyurethane foam material which is formed in situ in an annular space around an outside of the pipe and inside a shell positioned to define an annular space between the outside of the pipe and the inside of the shell by mixing and injecting polyurethane foam ingredients into the annular space to substantially fill the annular space with polyurethane foam and wherein the alkaline material is injected with at least one polyurethane foam ingredient to form polyurethane foam containing the alkaline material in an amount sufficient to produce a pH foam from about 8.0 to about 12 in water in the foam insulation.

12. A method for inhibiting external corrosion on a pipeline comprising a pipe and a fibrous insulting material around the pipe, the method comprising admixing an alkaline material with the fibrous insulating material around the pipe in an amount sufficient to produce a pH from about 8.0 to about 12.0 in water in the fibrous insulating material.

13. A corrosion inhibited pipeline comprising a pipe having an outside, a coating material containing an alkaline material in an amount sufficient to produce a pH from about 8.0 to about 12.0 in water in the coating material positioned around the outside of the pipe and an outer shell positioned around the outside of the pipe and having an inside, the coating material being positioned to substantially fill an annular space between the outside of the pipe and the inside of the outer shell.

14. The pipeline of claim 13 wherein the alkaline material is present in an amount sufficient to produce a pH of about 9.5.

15. The pipeline of claim 13 wherein the alkaline material is present in an amount from about 0.001 molar to about 1.0 molar based upon the moles of the alkaline material in one liter of water-saturated polymeric foam coating material.

16. The pipeline of claim 13 wherein the alkaline material is selected from the group consisting of sodium hydroxide, potassium hydroxide, sodium carbonate, ammonium hydroxide, lithium hydroxide, lithium hydroxide hydrates, sodium sulfide monohydrate, tribasic sodium orthophosphate, dibasic sodium phosphate, sodium metasilicate, potassium orthophosphate, potassium sulfide monopentahydrate and mixtures thereof.

17. The method of claim 16 wherein the alkaline material is tribasic sodium orthophosphate.

18. The method of claim 13 wherein a buffer material is present in the polymeric foam coating material to maintain the pH from about 8.0 to about 12.0.

19. The pipeline of claim 13 wherein the polymeric foam coating material is a polymeric foam insulation material.

20. A corrosion inhibited pipeline comprising a pipe having an outside, a fibrous insulating material around the outside of the pipe, the fibrous insulating material containing an alkaline material in the fibrous insulating material around the pipe in an amount sufficient to produce a pH from about 8.0 to about 12.0 in water in the fibrous insulating material.

* * * * *